United States Patent [19]

Pineau

[11] Patent Number: 4,468,016
[45] Date of Patent: Aug. 28, 1984

[54] SHOCK AND/OR VIBRATION DAMPING DEVICE FOR USE BETWEEN A SUPPORTING ELEMENT AND A SUPPORTED ELEMENT

[76] Inventor: André L. Pineau, 12, rue du Béarn, 92210-Saint-Cloud

[21] Appl. No.: 287,298

[22] Filed: Jul. 27, 1981

[30] Foreign Application Priority Data

May 8, 1981 [FR] France .................. 81 09252

[51] Int. Cl.³ .................. B60G 11/22; F16F 1/36; F16J 15/52
[52] U.S. Cl. .................. 267/141; 267/63 R; 267/153; 403/50
[58] Field of Search .................. 267/140, 140.1, 140.4, 267/141, 141.1, 141.2, 141.3, 141.4, 153, 122, 63 R, 35, 152, 8 R; 188/379; 248/615, 631; 403/50, 51, 335

[56] References Cited

U.S. PATENT DOCUMENTS

| | | | |
|---|---|---|---|
| 2,278,997 | 4/1942 | Knight | 403/335 |
| 2,612,370 | 9/1952 | Eger | 267/140.4 |
| 2,842,358 | 7/1958 | Nardi | 267/35 |
| 3,101,937 | 8/1963 | Stearns | 248/631 |
| 3,120,382 | 2/1964 | Paulsen | 267/141.1 |
| 3,219,305 | 11/1965 | Chartet | 267/153 |
| 3,738,633 | 6/1973 | Pineau | 267/141 |
| 3,831,923 | 8/1974 | Meldrum | 267/141 |
| 4,278,726 | 7/1981 | Wieme | 267/140.4 |

FOREIGN PATENT DOCUMENTS 0477307 10/1926 Fed. Rep. of Germany ...... 248/631
0852320 10/1952 Fed. Rep. of Germany .

*Primary Examiner*—Bruce H. Stoner, Jr.
*Assistant Examiner*—Robert J. Oberleitner
*Attorney, Agent, or Firm*—Steinberg & Raskin

[57] ABSTRACT

The invention relates to a shock and/or vibration damping device comprising a body adapted to be assembled to a supporting element, a concavity provided in the body in which is introduced a piston whose rod is adapted to be assembled to a supported element, and at least one resiliently deformable supporting membrane arranged in the cavity and interposed between the head of the piston and the cavity bottom wall. This membrane is mounted freely slidable at its periphery within the cavity and comprises in proximity to its periphery a stiffening element at least partially embedded in its mass. The head of the piston is advantageously embedded in the mass of another membrane which may be identical with the supporting membrane, the tops of the two membranes bearing against one another and wherein the shape of the surface of one of the membranes is at least partially conformed to the shape of the confronting surface of the other membrane.

12 Claims, 6 Drawing Figures

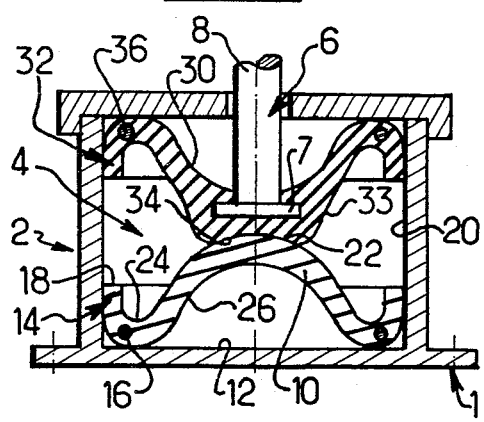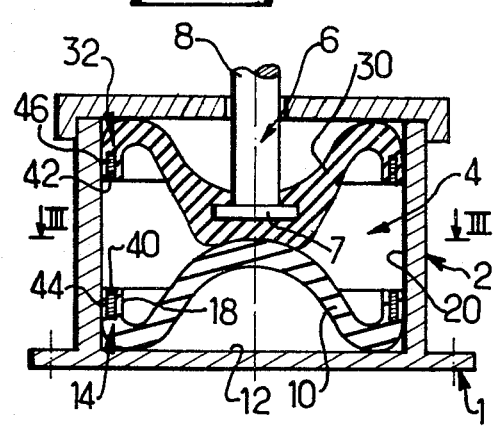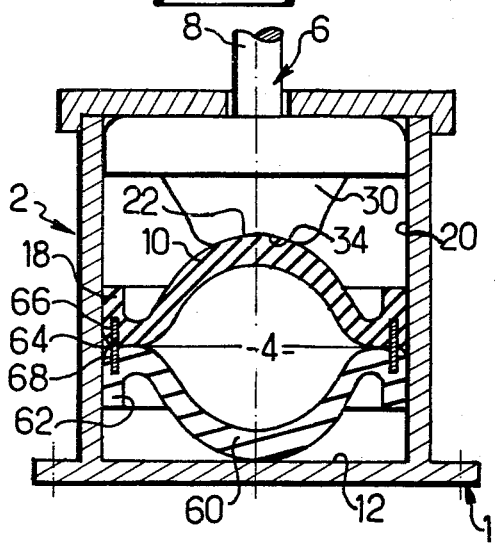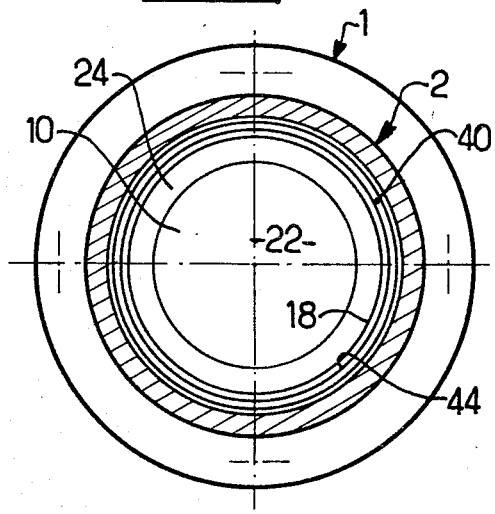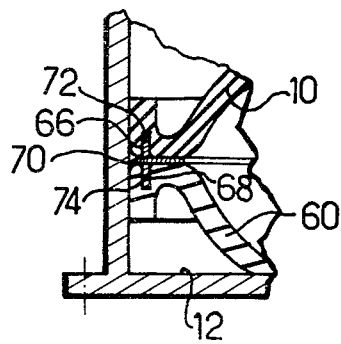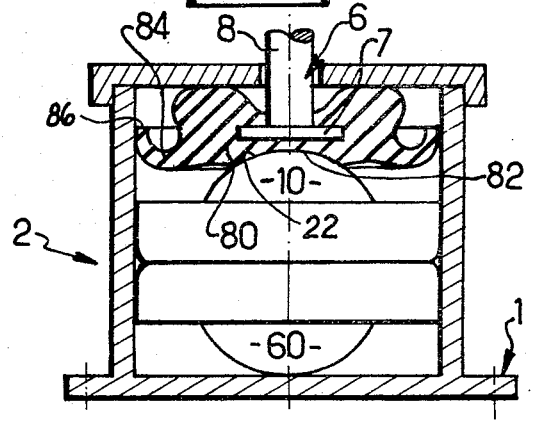

SHOCK AND/OR VIBRATION DAMPING DEVICE FOR USE BETWEEN A SUPPORTING ELEMENT AND A SUPPORTED ELEMENT

BACKGROUND OF THE INVENTION

The present invention relates essentially to a shock and/or vibration damping device for use between a supporting element and a supported element.

There are already known shock and/or vibration damping devices for use between a supporting element and a supported element, which comprises a body adapted to be assembled to one of the said elements and having a preferably substantially cylindrical cavity in which is introduced a piston whose rod is adapted to be assembled to the other one of the said elements. Such devices also comprise at least one resiliently so-called supporting deformable membrane arranged in the said cavity and interposed between the piston head and the cavity bottom wall facing it. Such devices are described for instance in applicant's French Pat. No. 70 03 678.

Such apparatus offer excellent multi-directional vibration-damping efficiency. Their shock absorbing capacity is good along their vertical center line owing to the considerable travel resulting from the provision of a resiliently deformable membrane.

On the other hand, their lateral shock damping capacity is relatively low owing to the limited horizontal displacement with respect to the center line of the damping device.

Thus, it may be said that the various damping devices known hitherto suffer from a certain number of drawbacks, one of which is their relatively low lateral-shock absorbing efficiency resulting from their very limited horizontal displacement.

Moreover, the arrangement in series of several membranes sliding on a fixed vertical axis pin, a very favorable arrangement for absorbing vertical shocks, is impossible in the horizontal plane. On the other hand, any attempt to obtain a significant lateral displacement on a single supporting membrane would result in excessive dimensions inconsistent with limited available spaces.

On the whole, therefore, it is difficult to obtain a lateral shock absorbing capacity that is satisfactory without lateral displacement being significant. This is all the more difficult as the said displacement must be small if a damping device suitable for practical purposes is to be obtained.

SUMMARY OF THE INVENTION

The purpose of the present invention, therefore, is to obviate the aforementioned drawbacks by providing a solution allowing excellent multi-directional shock and vibration damping efficiency, especially with respect to significant lateral shocks, to be obtained together with extremely small overall dimensions.

The said solution comprising, according to the invention, a device of the previously described type, which is characterized in that a piston head is embedded in the mass of a resiliently deformable membrane having a peripheral portion which freely and slidingly bears against the side wall of the cavity of the said body, the resiliently deformable membrane also normally bearing on a supporting membrane interposed between the piston head and the bottom wall of the cavity, and in that the shape of the surface of the membrane in which the piston head is embedded is advantageously at least partially conformed to the shape of the confronting surface of the supporting membrane on which it bears, thus producing a vertical component during the relative horizontal displacement of the piston and the body resulting from a lateral shock and thus efficiently contributing to the damping of horizontal shocks.

According to another characterizing feature of the invention, each membrane is being substantially bell-shaped, and the surface of the so-called piston head membrane is at least partially conformed to the top of the supporting membrane on which it bears.

According to another characterizing feature of the invention, the piston head membrane is provided along its periphery with a skirt portion relatively smaller in thickness than the rest of the membrane, thus forming a more flexible thin lip freely and slidingly bearing against the side wall of the cavity of the body. This more resilient, thin lip creates during the horizontal vibrations a low resonance frequency system that is highly favorable to the damping of the vibrations.

Advantageously, the said more flexible, thin lip displays a downwardly directed concavity, i.e., the top of the cavity is directed in opposite direction to the piston head.

According to another very important characterizing feature of the invention, the device is also provided, in proximity to the periphery of at least one aforesaid resiliently deformable membrane, with a stiffening element at least partially embedded in its mass.

According to another characterizing feature of the invention, the membrane is substantially bell-shaped and is provided with a peripheral skirt portion which bears against the side wall of the cavity, said skirt portion, according to the invention, being directed towards the top of the membrane and freely and slidingly bears against the side wall of the cavity, whereas the aforesaid stiffening element is sunk in the mass of the membrane in proximity to the point of inflection defined at the junction of the peripheral skirt portion and the bell portion of the membrane.

According to a particular form of embodiment, the stiffening element is substantially toric in shape.

According to a variant of embodiment, the said stiffening element is substantially cylindrical in shape and at least partially arranged in the mass of the said skirt portion.

According to another form of embodiment, the said skirt portion of the membrane is provided with a cylindrical annular open slot concentric with the body and in which is at least partially accommodated the said stiffening element.

According to a preferred form of embodiment, the device according to the invention includes a second resiliently deformable supporting membrane interposed between the piston head and the cavity bottom wall confronting it, and also provided with a skirt portion bearing against the side wall, the said two supporting membranes bearing against one another by their peripheral edge and preferably being assembled together through the medium of a common stiffening element.

According to a particular form of embodiment, the said second membrane also is substantially bell-shaped, in which case the top of one of the two membranes bears upon the cavity bottom wall confronting the piston head, whereas the top of the other membrane supports the piston head.

According to the variant of this embodiment, an annular slot is provided in the skirt portion of each membrane interposed between the piston head and the cavity bottom wall, the said slots opening opposite one another, whereas the aforesaid stiffening element is constituted by a cylinder of sufficient size to simultaneously penetrate into the said slots of the said membranes and assemble them together.

According to another variant of embodiment, the stiffening element may comprise a flat ring arranged between the supporting membranes and provided on both sides with a centering element accommodated in the corresponding slot of each membrane.

According to a particular form of embodiment, the piston head membrane is identical with the other membranes and advantageously displays a concavity directed towards the piston rod, although the contrary is also possible.

All the above characterizing features therefore provide a damping device which offers the desired resiliency in any direction and advantageously in the lateral direction so as to absorb lateral vibrations and shocks with an unexpectedly high efficiency. It will be noted that the presence of the stiffening device according to the invention allows friction to be limited or even practically eliminated while at the same time preserving the useful diameter of the membrane. It will be noted that the expression "the resiliently deformable membrane is mounted so as to be freely slidable at its periphery" or expressions similar thereto mean that it is mounted so as to be slidable at its periphery, with or without friction, within the cavity of the body in which the piston is introduced.

Also, as mentioned previously in connection with the horizontal shocks to which the device according to the invention may be subjected, the said device allows a vertical component to be produced during the relative horizontal displacement of the piston and the body of the device as a result of a lateral shock, thus efficiently contributing to the absorption of the horizontal shocks.

Lastly, the device according to the invention occupies minimum space and is moreover easy to manufacture.

DESCRIPTION OF THE DRAWING

Other characterizing features and advantages of the invention will appear from the following explanatory description with reference to the appended drawings given solely by way of illustration and which, therefore, may in no way limit the scope thereof.

In the drawings:

FIG. 1 is a sectional view along the axis of symmetry of a first embodiment of a damping device according to the present invention;

FIG. 2 illustrates a variant of the embodiment of the device shown in FIG. 1;

FIG. 3 is a sectional view taken along line III—III of FIG. 2;

FIG. 4 is a view, partially in section, of another embodiment of a damping device according to the present invention;

FIG. 5 is an enlarged detailed view of a portion of FIG. 4; and

FIG. 6 is a view, partially in section, of a variant of the embodiment of the device shown in FIG. 4.

Referring to FIG. 1, a shock and/or vibration damping device for use between a supporting element 1 and a supported element (not shown) comprises a body 2 adapted to be assembled to one of the supporting and supported elements, the said body having a preferably substantially cylindrical cavity 4 in which is introduced a piston 6 the rod 8 of which is adapted to be assembled to the other one of the said supporting and supported elements. The damping device also comprises at least one resiliently deformable supporting membrane 10 arranged in the said cavity 4 and interposed between the head 7 of the piston 6 and the bottom wall 12 of the cavity 4 confronting the piston head 7.

According to an essential characterizing feature of the present invention, the supporting membrane 10 is mounted so as to be freely slidable, i.e., with or without friction, by its peripheral portion 14 within the said cavity and the said membrane comprises in proximity to its peripheral portion 14 a stiffening element 16 at least partially embedded in its mass.

Advantageously, the membrane is substantially bell-shaped as shown and is provided at its periphery with a skirt portion 18 which bears against the side wall of the cavity of the body 2. The skirt portion 18 is directed towards the top 22 of the membrane, whereas the stiffening element 16 is sunk in the mass of the membrane 10 in proximity to the point of inflection 24 defined by the peripheral skirt portion 18 and the bell portion 26 of the membrane 10.

In the particular form of embodiment illustrated in FIG. 1, the stiffening element 16 is substantially toric in shape. It is preferably formed of metal and may be constituted by one or several metal elements in the same way as tire reinforcements, so that stiffening elements similar to those used in tire beads or tire thread belts can of course be used in the present invention.

It will be noted that the membrane 10 bears freely slidingly against the side wall of the cavity 4 of the body 2 and that it also is freely applied against the bottom wall 12 of the cavity 4.

According to an essential characterizing feature of the invention, the head 7 of the piston 6 is embedded in the mass of another resiliently deformable membrane 30 having a peripheral portion 32 which freely and slidingly bears against the side wall 20 of the cavity 4. Advantageously, the surface 33 of the membrane 30 of the head 7 of the piston 6 is at least partially conformed to the confronting surface 22 of the membrane 10 on which it takes its bearing, as is seen clearly in FIG. 1.

Advantageously, the membrane 30 of the piston head is, as shown, identical with the membrane 10 interposed between the head of the piston 6 and the bottom wall 12 of the cavity. Advantageously, the membrane 30 displays a concavity directed towards the rod 8 of the piston 6 so that the top 34 of the membrane 30 bears against the top 22 of the membrane 10. Thus, each membrane being substantially bell-shaped, the surface 33 of the piston head membrane is at least partially conformed, as its top 34, to the top 22 of the membrane 10 on which it bears.

As indicated, the membrane 30 may be identical with the membrane 10 and may therefore also be provided with a stiffening element 36 sunk in the mass of its skirt portion 32 which also may be toric in shape.

According to the variant of the embodiment illustrated in FIG. 2, in which the same reference numbers are used for the same parts, it will be noted that in this case each membrane incorporates a stiffening element 40, 42 which is substantially cylindrical in shape and is at least partially inserted in the mass of the skirt portions 18, 32 of the membranes 10, 30, respectively. In this case, the skirt portions 18, 32 are provided with annular cylindrical open slots 44, 46 concentric with the body 2 and in which are at least partially accommodated the stiffening elements 40, 42, respectively. In the example illustrated, the said slot is so made that the stiffening element is mounted flush.

As indicated previously, the presence of such stiffening elements allows friction to be limited and even practically eliminated by maintaining the illustrated shape of the peripheral portion of the membranes, while at the same time offering the advantage of allowing the membrane to freely slide on the side wall 20 of the cavity 4 of the body 2.

Referring to the embodiment illustrated in FIGS. 4 and 5, a second resiliently deformable membrane 60 may be interposed between the head of the piston 6 and the bottom wall 12 of the cavity 4 confronting it. This second membrane 60 is also advantageously provided with a skirt portion 62 freely slidingly bearing against the side wall 20 of the body 2, the two membranes 10 and 60 bearing against one another by their peripheral skirt portions 62, 18. The membranes 60, 10 are preferably assembled together through the medium of a common stiffening element 64.

In this case, annular slots 66, 68 are provided in said skirt portions 18, 62, respectively, of each membrane 10, 60 in confronting relationship to one another, the stiffening element 64 being in this case constituted by a cylinder of sufficient size to be simultaneously inserted into the said slots 66, 68 as shown, thus assembling the membranes 10, 60 together.

According to a variant of this embodiment illustrated in FIG. 5, the stiffening element may comprise a flat ring 70 arranged between the membranes 60, 10 and provided on both sides with centering elements 72, 74 accommodated in the corresponding slots 66, 68 of each membrane 10, 60, respectively.

The thickness of the flat ring 70 of the stiffening element may be varied at will in order to increase the travel.

Referring to FIG. 6, there is shown another embodiment of the membrane in which the head 7 of the piston 6 is embedded. It will also be noted that the surface 82 of the membrane 80 is at least partially conformed to the top 22 of the membrane 10 on which it bears. As indicated previously, this arrangement allows, in the case of horizontal shocks, a vertical component to be produced which efficiently contributes to the damping of the said shocks.

Furthermore, the thickness of the skirt portion 84 of the membrane 80 is advantageously substantially reduced compared to the general thickness of the membrane 80, thus forming a highly flexible thin lip.

In the case of horizontal vibration, the thin lip 84 produces a low-frequency resonance system which is highly favorable to the damping of the vibrations.

On the occurrence of lateral shocks, the thin lip 84 is quickly "by-passed" (i.e., it no longer plays any part in supporting the forces resulting from the shock) owing to its small thickness (it only fulfils a vibratory function), the shock thus being transmitted to the thicker portion of the membrane 80.

The thin lip 84 displays a preferably downwardly directed concavity, i.e., the top 86 of the concavity is directed in the opposite direction to the rod 8 of the piston 6.

In this case, the thin lip 84 preferably is not provided with a stiffening element as in the case illustrated in FIGS. 1 and 2.

Features of the various above-described embodiments may in general be combined together. It will be noted that each membrane is advantageously mounted without prestress, i.e., without previous compressive deformation when being mounted.

The invention therefore is by no means limited to the particular embodiments described and illustrated, but on the contrary encompasses all means constituting technical equivalents to the means described and illustrated as well as their combinations should the latter be carried out according to its gist and within the scope of the protection as claimed.

What is claimed is:

1. A shock and/or vibration damping device for use between a supporting element and a supported element, comprising a body adapted to be assembled to one of said elements including a substantially cylindrical cavity having a cavity side wall and a cavity bottom wall, a piston comprising a piston head situated in said cavity and a piston rod, the rod being adapted to be assembled to the other one of said elements and the head being embedded in the mass of a resiliently deformable piston head membrane, and at least one resiliently deformable supporting membrane arranged in said cavity and interposed between the piston head and the cavity bottom wall confronting it, each membrane having a substantially bell-shaped major portion, the shape of the surface of the piston head membrane is at least partially conformed to the shape of the surface of the said supporting membrane on which it bears; the piston head membrane and the supporting membrane are each provided with a respective peripheral skirt portion which is directed towards the top of the respective membrane with a point of inflection defined by the junction of each said peripheral skirt portion and the bell portion of the respective membrane, the peripheral skirt portion thickness of each of said piston head supporting membranes is smaller than the thickness of the membrane major portion to form a thinner, more flexible lip, said flexible lip of said piston head membrane and said supporting membrane freely and slidingly bearing against the side wall of the cavity of said body, said thinner lip having a reverse concavity with respect to that of the membrane bell-shaped major portion, and a stiffening element is at least partially embedded in the mass of at least one membrane close to said point of inflection defined by the junction of said peripheral skirt portion and the bell portion of said at least one membrane provided with said stiffening element.

2. The device of claim 1, wherein said stiffening element is substantially toric in shape.

3. The device of claim 1, wherein said stiffening element is substantially cylindrical in shape.

4. The device of claim 1, comprising two said supporting resiliently deformable bell-shaped membranes interposed between the piston head and the confronting bottom wall of the cavity, both of said supporting membranes being provided with a skirt portion bearing freely and slidingly against the side wall of said body cavity.

5. The device of claim 4, wherein said two supporting membranes interposed between the piston head and the bottom wall of the cavity bear against one another by their peripheral edge and are assembled together by a common stiffening element.

6. The device of claim 5, wherein the top of one of said two supporting membranes bears on the cavity bottom wall facing the piston head and wherein, the top of the other supporting membrane bears against said piston head membrane.

7. A shock and/or vibration damping device for use between a supporting element and a supported element, comprising a body adapted to be assembled to one of said elements including a substantially cylindrical cavity having a cavity side wall and a cavity bottom wall, a piston comprising a piston head situated in said cavity and a piston rod, the rod being adapted to be assembled to the other one of said elements and the head being embedded in the mass of a resiliently deformable piston head membrane, and at least one resiliently deformable supporting membrane arranged in said cavity and interposed between the piston head and the cavity bottom wall confronting it, each membrane having a substantially bell-shaped major portion, the shape of the surface of the piston head membrane is at least partially conformed to the shape of the surface of the said supporting membrane on which it bears and the piston head and supporting membranes are each provided with a peripheral skirt portion which is directed towards the top of the respective membrane with a point of inflection defined by the junction of said peripheral skirt portions and the respective bell portions of the membrane, the peripheral skirt portion thickness of each said piston head and supporting membranes is smaller than the thickness of the major portion of said respective membranes to form a thinner, more flexible lip on each membrane, said flexible lip of each of said membranes freely and slidingly bearing against the side wall of the cavity of said body, said thinner lip of said piston head membrane having a concavity directed towards the bottom wall of the cavity of said body, a stiffening element is at least partially embedded in the mass of each membrane close to said point of inflection defined by the junction of said peripheral skirt portion and the bell portion of each membrane, each said stiffening element being substantially cylindrical in shape and said skirt portion of each membrane is provided with a cylindrical annular open slot concentric with said body and in which is at least partially accommodated a respective one of said stiffening elements.

8. A shock and/or vibration damping device for use between a supporting element comprising a body adapted to be assembled to one of said elements including a substantially cylindrical cavity having a cavity side wall and a cavity bottom wall, a piston comprising a piston head situated in said cavity and a piston rod, the rod being adapted to be assembled to the other one of said elements and the head being embedded in the mass of a resiliently deformable piston head membrane, and at least one resiliently deformable supporting membrane arranged in said cavity and interposed between the piston head and the cavity bottom wall confronting it, each membrane having a substantially bell-shaped major portion, the shape of the surface of the piston head membrane is at least partially conformed to the shape of the surface of a first supporting membrane on which it bears and the piston head membrane is provided with a peripheral skirt portion which is directed towards the top of the piston head membrane with a point of inflection defined by the junction of said peripheral skirt portion and the bell portion of the membrane, the peripheral skirt portion thickness of said piston head membrane is smaller than the thickness of the major portion thereof to form a thinner, more flexible lip, said flexible lip of said piston head membrane freely and slidingly bearing against the side wall of the cavity of said body, said thinner lip having a concavity directed towards the bottom wall of the cavity of said body; a second supporting membrane provided with a skirt portion, said two supporting membranes bearing against one another by their peripheral edge and assembled together by a common stiffening element, an annular slot is provided in the skirt portion of each supporting membrane, said slots opening opposite one another, and wherein said common stiffening element is constituted by a cylinder of sufficient size to be inserted simultaneously into said slots of said membranes.

9. A shock and/or vibration damping device for use between a supporting element and a supported element, comprising a body adapted to be assembled to one of said elements including a substantially cylindrical cavity having a cavity side wall and a cavity bottom wall, a piston comprising a piston head situated in said cavity and a piston rod, the rod being adapted to be assembled to the other one of said elements and the head being embedded in the mass of a resiliently deformable piston head membrane, and at least one resiliently deformable supporting membrane arranged in said cavity and interposed between the piston head and the cavity bottom wall confronting it, each membrane having a substantially bell-shaped major portion, the shape of the surface of the piston head membrane is at least partially conformed to the shape of the surface of a first supporting membrane on which it bears and the piston head membrane is provided with a peripheral skirt portion which is directed towards the top of the piston head membrane with a point of inflection defined by the junction of said peripheral skirt portion and the bell portion of the membrane, the peripheral skirt portion thickness of said piston head membrane is smaller than the thickness of the major portion thereof to form a thinner, more flexible lip, said flexible lip of said piston head membrane freely and slidingly bearing against the side wall of the cavity of said body, said thinner lip having a concavity directed towards the bottom wall of the cavity of said body, a second supporting membrane being present and interposed between the piston head and the confronting bottom wall of the cavity, both of said supporting membranes being provided with a skirt portion bearing freely and slidingly against the side wall of said body cavity, said two supporting membranes bearing against one another by their peripheral edge and assembled together by a common stiffening element, an annular slot is provided in the skirt portion of each supporting membrane, said common stiffening element including a flat ring arranged between the membranes and provided on both sides with a centering element accommodated in corresponding ones of the slots of the membranes.

10. The device of claim 1, wherein said piston head membrane and said supporting membrane interposed between the piston head and the bottom wall of the cavity of said body are substantially identical, said piston head membrane displaying a concavity directed towards the piston rod.

11. The device of claim 1, wherein each membrane is mounted in a non-pre-stressed state.

12. The device of claim 1, wherein said stiffening element is made of metal and may comprise at least one element similar to those of tire reinforcements.

* * * * *